No. 871,861. PATENTED NOV. 26, 1907.
E. CARLIPP.
APPARATUS FOR DEMONSTRATING THE STRAINS IN BUILDING CONSTRUCTIONS.
APPLICATION FILED JAN. 2, 1907.

2 SHEETS—SHEET 1.

Attest:
C. S. ——
Edward N. Sarton

Inventor
Ernst Carlipp
by William Wallace White
Attys.

No. 871,861. PATENTED NOV. 26, 1907.
E. CARLIPP.
APPARATUS FOR DEMONSTRATING THE STRAINS IN BUILDING CONSTRUCTIONS.
APPLICATION FILED JAN. 2, 1907.
2 SHEETS—SHEET 2.
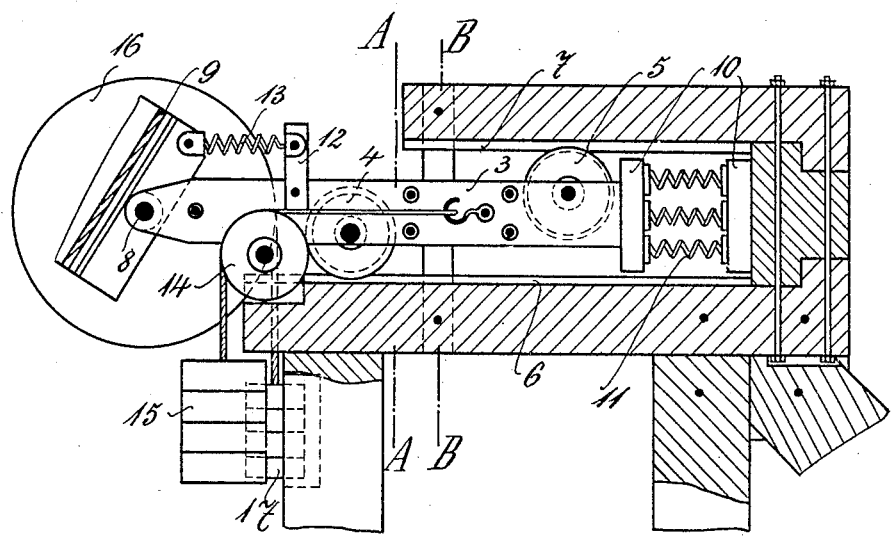
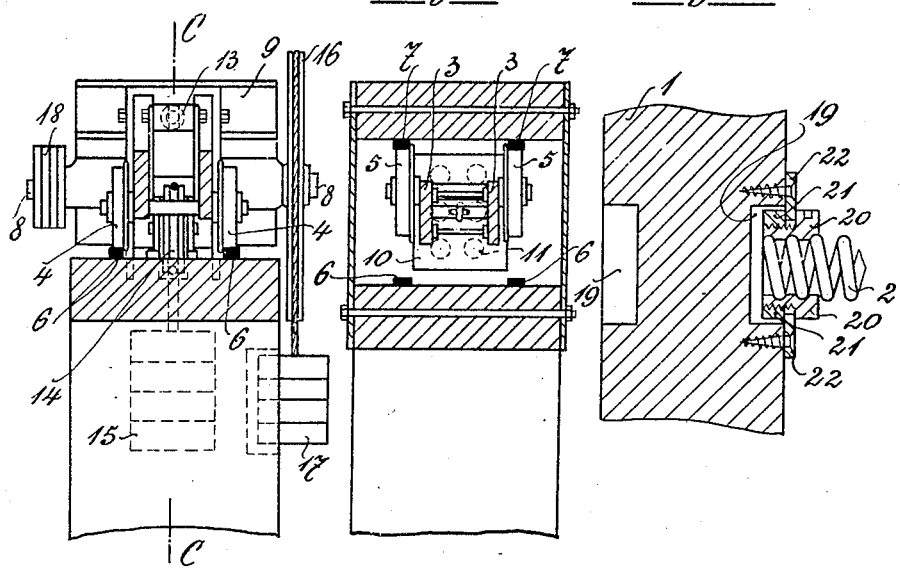

UNITED STATES PATENT OFFICE.

ERNST CARLIPP, OF ERLANGEN, GERMANY.

APPARATUS FOR DEMONSTRATING THE STRAINS IN BUILDING CONSTRUCTIONS.

No. 871,861.          Specification of Letters Patent.          Patented Nov. 26, 1907.

Application filed January 2, 1907. Serial No. 350,421.

*To all whom it may concern:*

Be it known that I, ERNST CARLIPP, engineer, subject of the German Emperor, residing at Erlangen, Bavaria, Germany, have invented new and useful Improvements in Apparatus for Demonstrating the Strains in Building Constructions, of which the following is a specification.

This invention relates to a model for demonstrating the strains arising in building constructions. In order to render these visible the constructional parts, according to this invention, are composed alternately of solid pieces and adjustable springs, so that from the alteration of form of the latter the distribution of pressure may be concluded or ascertained.

The model does not only serve for demonstrating the kind of strain and approximately its degree or extent, but also the alteration of the strains with variable loads, and, when the load remains uniform, the alteration of the distribution of the strain which takes place in consequence of the elastic alteration of form of the constructional parts.

Three models are shown as an example in the accompanying drawings; in which:—

Figure 1:
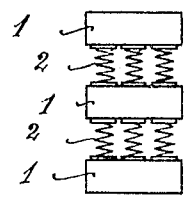
Figure 2:
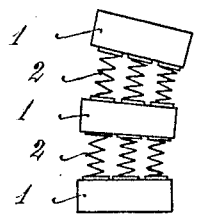
Figure 3:
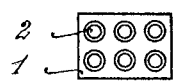
Figure 4:
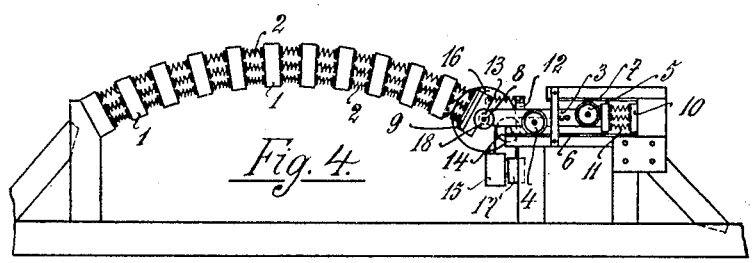

Figures 1—3 show a simple model for demonstrating the action of the loads in or out of the center line of the apparatus. Fig. 4 shows the arrangement of the model in the form of an arch; Fig. 5 the right hand support of the arch on an enlarged scale; Fig. 6 is a section on the line A—A of the support; Fig. 7 is a section of the line B—B of Fig. 5; Fig. 8 shows one device for fixing and adjusting the springs.

With a load in the center line of the apparatus (Fig. 1) the springs 2 are only compressed, so that the solid parts 1 are displaced parallel with their original positions; in the case of a load out of the center line of the apparatus (Fig. 2) bending strains also arise. In similar manner compressive and torsional strains may also be demonstrated.

Fig. 3 shows a plan view of the arrangement of the springs, the number of which may of course vary.

The model shown in Figs. 4—8 may be used for demonstrating the alterations of the strains arising even with a uniform load, in consequence of the alteration of form of the constructional parts and its supports. This is particularly important because static calculations can always be carried out only for a given condition of the respective construction, but by the model the possibility is afforded of judging in what manner variations from the assumed condition apply to the distribution of pressure.

The left hand support of the arch carrier is fixed, the right hand support is formed by a beam 3 running with rollers 4 and 5 on rails 6 and 7, which beam consists of two bars held together by bolts and a headpiece mounted on it, revoluble on a shaft 8. The rear end of the beam 3 bears against a cushion formed of springs 11 and a fixed or solid piece 10, while the headpiece 9 is exposed to the action of a spring 13 engaging against a support 12. The parts 10, 11 and 13 may be replaced by rigid parts for the purpose of making the support a fixed one. A tractive force may be exerted on the beam 3, in addition to that exerted by the springs, by a weight 15 which hangs on a cord running over the roller 14, and a turning action on the headpiece 9 by means of a weight 17 which hangs on a cord running over a wheel 16. For counterbalancing the weight 17 which loads the beam 3, one sidedly, a counterweight 18 (Fig. 6) is employed.

Now in order to demonstrate the tensile displacements arising in consequence of the elastic alterations of form, the support is first fixed and the arch abutment loaded. Alterations of form then result in the spring parts 2 of the arch, from which the way in which the strains are distributed becomes apparent. For instance, when the load remains constant, not only will compressive strains be indicated such as would result from the calculation disregarding the elastic shortening of the center line of the arch, but also bending strains will be shown. The application of solid counter-supports corresponds to an assumption usually lying at the basis of a static calculation. Now if the support be released so that it can yield elastically against the action of the springs 11 and 13, this case corresponds to the actual elastic yielding of the support, and in spite of the load remaining uniform there always appear, as compared with the first case, substantial differences in the distribution of pressure in the arch abutments, from which differences the reliability of the results of the calculation may be concluded.

In order to obtain an idea as to the dependence of the alterations of the pressure and the pressure on the supports connected therewith, of various sized displacements and twisting movements of the support, weights 15 and 17 are employed after the springs 11 and 13 have been removed.

The alterations of pressure in the arch abutments are particularly clearly shown if they are coated with plaster or the like. The places at which cracks are formed on an alteration of the weight load, and the width of these cracks, then afford a clear picture of the displacement of the pressure in the arch abutments.

An arrangement for adjusting the springs is shown in Fig. 8. Recesses 19 are provided in each intermediate piece 1, which recesses are covered with annular disks 22 screwed thereon. The inner edge of these disks engages in a sleeve consisting of the parts 20 and 21 which consequently can turn but not be displaced. It is provided with an inner thread in which the spiral springs are screwed by turning the sleeve and so may be suitably adjusted. The strength of the springs corresponds to the co-efficient of elasticity of the material of the abutment support. By inserting springs of different strength the behavior of composite building materials such, for instance, as ferro-concrete and the like, may be demonstrated.

Of course models of the kind hereinbefore described may be prepared for the most varied cases. They are mainly intended to be employed for instructional purposes in teaching statics and the theory of elasticity, they may also, however, be directly employed for judging the distribution of forces in constructions, which are with difficulty accessible to static calculation, and to which they are adapted or formed.

I declare that what I claim is:—

1. An apparatus for demonstrating the strains arising in building construction, comprising a plurality of elements, said elements consisting of alternately arranged springs and blocks, said springs indicating by their change of form the distribution of strains.

2. An apparatus for demonstrating the strains arising in building construction, comprising a pair of opposing abutments, a plurality of elements interposed between said abutments, comprising alternately arranged yielding and non-yielding members, which by their change in form demonstrate the distribution of strains, and means for supporting one of the abutments so as to permit it to have a pivoting and also a lateral yielding movement, substantially as described.

In testimony whereof I have signed my name to this specification in the presence of two subscribing witnesses.

ERNST CARLIPP.

Witnesses:
 ANDREAS STICH,
 GEORGE ADAM STEINMANN.